(12) United States Patent
Potter (10) Patent No.: US 8,010,530 B2
(45) Date of Patent: Aug. 30, 2011

(54) PRESENTATION OF MULTILINGUAL METADATA

(75) Inventor: Charles Mike Potter, Nepean (CA)

(73) Assignee: International Business Machines Corporation, Armonk, NY (US)

(*) Notice: Subject to any disclaimer, the term of this patent is extended or adjusted under 35 U.S.C. 154(b) by 355 days.

(21) Appl. No.: 12/183,396

(22) Filed: Jul. 31, 2008

(65) Prior Publication Data

US 2008/0288242 A1  Nov. 20, 2008

(51) Int. Cl.
G06F 17/30 (2006.01)
G06F 7/00 (2006.01)
(52) U.S. Cl. .................................................... 707/732
(58) Field of Classification Search ............... 707/732
See application file for complete search history.

(56) References Cited

U.S. PATENT DOCUMENTS

| | | | |
|---|---|---|---|
| 6,018,742 A | 1/2000 | Hebert, III | |
| 6,092,036 A | 7/2000 | Hamann | |
| 6,339,755 B1 | 1/2002 | Hetherington et al. | |
| 6,983,238 B2 | 1/2006 | Gao | |
| 7,194,506 B1 * | 3/2007 | White et al. | 709/203 |
| 2002/0175937 A1 | 11/2002 | Blakely et al. | |
| 2002/0184308 A1 | 12/2002 | Levy et al. | |
| 2003/0046527 A1 | 3/2003 | Musuchenborn | |
| 2003/0074481 A1 * | 4/2003 | Fox et al. | 709/310 |
| 2003/0154071 A1 * | 8/2003 | Shreve | 704/9 |
| 2004/0015408 A1 | 1/2004 | Rauen et al. | |

FOREIGN PATENT DOCUMENTS

| | | |
|---|---|---|
| WO | WO0002147 | 1/2000 |
| WO | WO0067117 | 11/2000 |
| WO | WO03036472 | 5/2003 |

OTHER PUBLICATIONS

"An Internationalised Object Data Mode: A Locale-Based Approach", Proc. 9th Int'l Conference on Data Management of Data [COMAD98], Hyderbad, India, 1998.*
Sybase® PowerDesigner® Conceptual Data Model User's Guide, Version 9.5, Jul. 2002.*
Steve Atkin et al., "IBM Graphical Locale Builder," International Business Machines, 12th International Unicode Conference, Tokyo, Japan, Apr. 1998.
Sybase PowerDesigner Conceptual Data Model User's Guide, Version 9.5, Jul. 2002.

* cited by examiner

Primary Examiner — Kuen S Lu
(74) Attorney, Agent, or Firm — Stephen R. Tkacs; Stephen J. Walder, Jr.; Erin C. Ming (57) ABSTRACT

Mechanisms for representing multiple locales in metadata models are provided. The mechanisms comprise a locale repository for storing locale information used to display multilingual metadata, and a display module for displaying the metadata model. The locale repository has locale references for representing locales, and multiple values of locale sensitive objects in a metadata model for representing locale values of the objects.

12 Claims, 13 Drawing Sheets

| Properties | | |
|---|---|---|
| Properties | Languages | |
| name | description | definition |
| Query Subject | Query Subject | <Click...to edit.> |
| ConversionRate | Query Subject No. 1 | <Click...to edit.> |

Figure 4

| Properties | | | | |
|---|---|---|---|---|
| Properties | Languages | | | |
| | name | | description | |
| | English (U.S.) | Albanian | English (U.S.) | Albanian |
| Query Subject | QuerySubject | (sq)QuerySubject | QuerySubject | (sq)QuerySubject |
| ConversionRate | ConversionRate | (sq)ConversionRate | Query Subject No.1 | (sq)QuerySubject |

| Properties | | | | | | | | |
|---|---|---|---|---|---|---|---|---|
| Properties Languages | | | | | | | | |
| | Name | | | Description | | | Screen Tip | |
| | English | French | ▾ | English | French | ▾ | English | French |
| COUNTRY | COUNTRY | (fr) COUNTRY | | Name of country | (fr)Name of country | | For sample model | (fr)For sample mo... |
| COUNTRY | COUNTRY | (fr) COUNTRY | | Item of COUNTR... | (fr)Item of COUN... | | For sample model | (fr)For sample mo... |
| PRODUCT | PRODUCT | (fr) PRODUCT | | Name of the prod... | (fr)Name of the pr... | | For sample model | (fr)For sample mo... |
| PRODUCTNUMBER | PRODUCTNUMB... | (fr) PRODUCTNU... | | Item number | (fr)Item number | | | |

| | A | B |
|---|---|---|
| 1 | en | fr |
| 2 | COUNTRY | (fr) COUNTRY |
| 3 | For sample model | (fr) For sample model |
| 4 | Item number | (fr) Item number |
| 5 | Item of COUNTRY table | (fr) Item of COUNTRY tale |
| 6 | Name of country | (fr) Name of country |
| 7 | Name of the product | (fr) Name of the product |
| 8 | PRODUCT | (fr) PRODUCT |
| 9 | PRODUCTNUMBER | (fr) PRODUCTNUMBER |
| 10 | | |
| 11 | | |

| Properties | | | | | | | | |
|---|---|---|---|---|---|---|---|---|
| Properties Languages | | | | | | | | |
| | Name | | | Description | | | Screen Tip | |
| | English | French | ▼ | English | French | ▼ | English | French |
| COUNTRY | COUNTRY | PAYS | | Name of country | nom de pays | | For sample model | pour modele |
| COUNTRY | COUNTRY | PAYS | ▼ | Item of COUNTR... | (ft) Item of COUN... | | For sample model | pour modele |
| PRODUCT | PRODUCT | PRODUIT | | Name of the prod... | nom de produit | | For sample model | pour modele |
| PRODUCTNUMBER | PRODUCTNUMB... | NUMERODEPR... | | Item number | numero de produit | | | |

# PRESENTATION OF MULTILINGUAL METADATA

FIELD OF THE INVENTION

The invention relates to a system and method of presenting multilingual metadata.

BACKGROUND OF THE INVENTION

It is known in the art that reasonably simple extensions to metadata used by modelers permits multiple versions of the models with little extra effort on the part of the authors. The business intelligence database systems involved are more and more used internationally, and it has been a growing problem to produce metadata models for use in more than one locale.

Traditionally, the problem has been addressed by producing separate definitions for each locale, with consequent duplication of effort, and problems in maintenance (keeping them in step).

It is desirable to permit the metadata model user to work in multiple locales in a single session. Also, it is desirable to permit authors from different locales to update the model independently. One difficulty is to provide these abilities without greatly increasing the complexity of the metadata description.

SUMMARY OF THE INVENTION

The present invention solves one or more of the problems described above.

In accordance with an embodiment of the present invention, there is provided a system for representing multiple locales in metadata models. The system comprises a locale repository for storing locale information used to display multilingual metadata, and a display module for displaying the metadata model. The locale repository has locale references for representing locales, and multiple values of locale sensitive objects in a metadata model for representing locale values of the objects.

In accordance with another embodiment of the present invention, there is provided a method of representing multiple locales in metadata models. The method comprises the steps of storing locale information used to display a multilingual metadata model, and displaying the metadata model.

In accordance with another embodiment of the present invention, there is provided a computer data signal embodied in a carrier wave and representing sequences of instructions which, when executed by a processor, cause the processor to perform a method of representing multiple locales in metadata models. The method comprises the steps of storing locale information used to display a multilingual metadata model, and displaying the metadata model.

In accordance with another embodiment of the present invention, there is provided a computer-readable medium having computer readable code embodied therein for use in the execution in a computer of a method of representing multiple locales in metadata models. The method comprises the steps of storing locale information used to display a multilingual metadata model, and displaying the metadata model.

In accordance with another embodiment of the present invention, there is provided a computer program product for use in the execution in a computer of a system for representing multiple locales in metadata models. The computer program product comprises a locale repository for storing locale information used to display multilingual metadata, and a display module for displaying the metadata model. The locale repository has locale references for representing locales, and multiple values of locale sensitive objects in a metadata model for representing locale values of the objects.

DETAILED DESCRIPTION OF THE PREFERRED EMBODIMENTS

Metadata is a means for a database administrator to model the structure of a set of databases. The modelling tool allows the user to create a visual representation of the organizational hierarchy of the databases being modelled. The first step is to import the metadata descriptions from all the databases to be modelled. Then the user can define which languages are to be supported in the model (although this step can be done at any time in the lifecycle of the model).

Users may wish to view and work with metadata models where properties of objects in metadata models can have multiple language values. Properties tables can be established to view, add, delete and modify properties in objects of a metadata model. Examples of properties tables can be found in FIGS. 3, 4, 12A to 12D.

Figure 1:
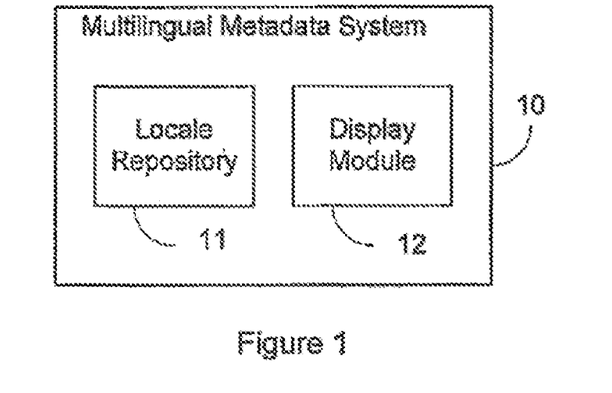
FIG. 1 shows an example of a multilingual metadata system, in accordance with an embodiment of the present invention.

FIG. 1 shows an example of a multilingual metadata system 10, in accordance with an embodiment of the present invention. The multilingual metadata system 10 comprises a locale repository 11 for storing locale (or language) information used to display multilingual metadata, and a display module 12 for displaying the metadata model. The locale repository 11 may be a memory storage area, including a database file, used to store information relating to the languages of locales. The local repository includes locale references, and multiple values of locale sensitive objects in a metadata model. The locale references represent different locales, and the multiple values represent different locale values of the objects in the metadata model. The display module 12 may be software code for displaying properties of objects in the metadata model.

Figure 2:
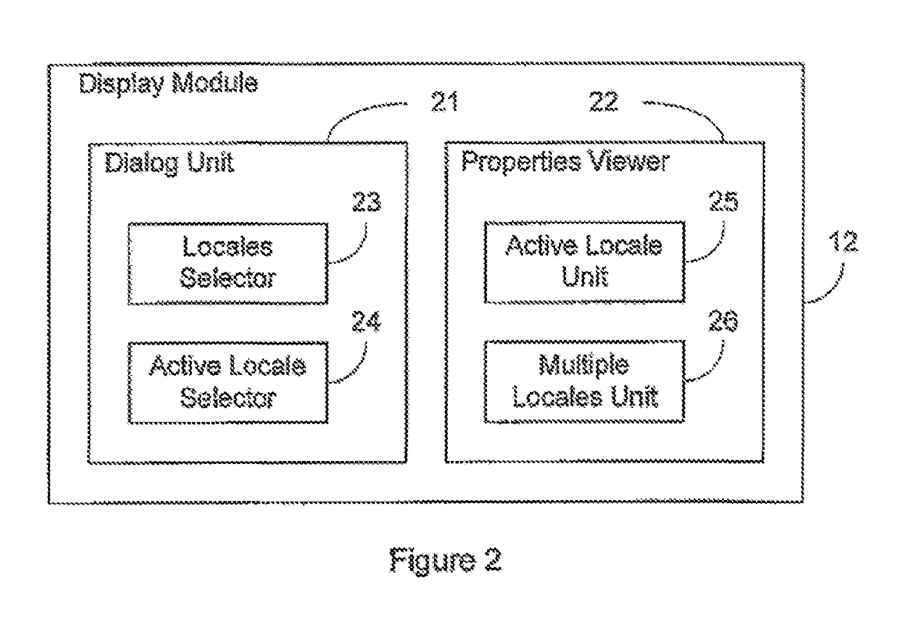
FIG. 2 shows an example of a display module, in accordance with the multilingual metadata system.

FIG. 2 shows an example of a display module 12, in accordance with the multilingual metadata system 10. The display module 12 comprises a dialog unit 21 for modifying settings of the display module 12, and a properties viewer 22 for displaying the locale sensitive properties of objects in the metadata model. The dialog unit 21 comprises a locales selector 23 for designating one or more locales (or languages) from the locale repository 11 in which the properties of the metadata model may be displayed, and an active locale selector 24 for setting the active locale (or language) of the display of the metadata model.

Figure 3:
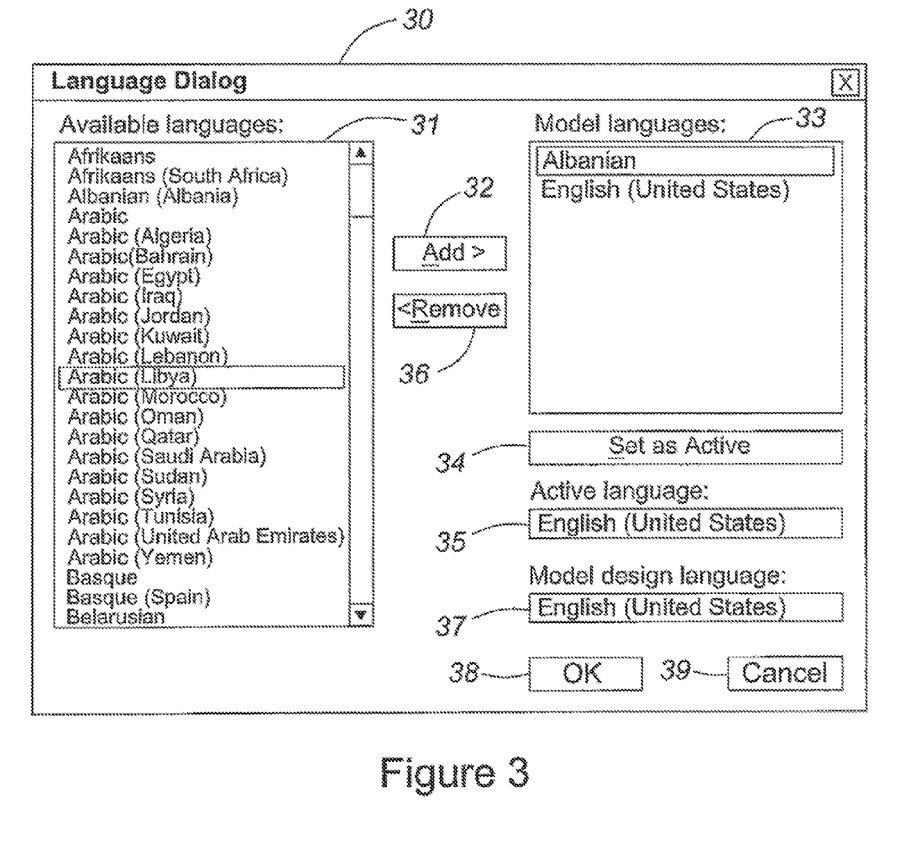
FIG. 3 shows a screen shot of an example of a dialog unit.

FIG. 3 shows a screen shot of an example of a dialog unit 21, called Language Dialog 30. The Language Dialog 30 is a user interface dialog comprising a locales selector 23 in the form of a selection box called Available Languages 31, an Add button 32, and a Model Languages box 33. A user may select a locale in the Available Languages box 31 and add the locale to the Model Languages box 33 using a mouse or other pointing device by clicking on the Add button 32. Locales may be removed from the Model Languages box 33 by selecting a locale and clicking on the Remove button 36. The Model Languages box 33 is a collection of locales (or languages) that represent the locales of locale sensitive properties of objects in a metadata model. The model design language is included in the Model Languages box 33, and should not be removed as this language is used for internal purposes (e.g., object referencing). The active language should not be removed as well, except by changing the active language. The Language Dialog 30 also comprises an active locale selector 24 in the form of a Set as Active button 34, and an Active Language text box 35. A user may highlight a locale in the Model Languages box 33 and click on the Set as Active button 34 to select an active locale for the metadata model. The active locale is displayed in the Language Dialog 30 with an Active Language box 35. The locale of the design language of the metadata model is indicated in the Model Design Language box 37. Once a user has made the desired selections in the Language Dialog 30, the user may view the properties of objects of the metadata model by clicking on the OK button 38. Alternatively, a user may abort the Language Dialog 30 by clicking on the Cancel button 39.

The user has the ability to select the set of locales that will be supported by the metadata model. Locales may be added or removed at any time, including at model creation time. When a new locale is added, every property (that is sensitive to locale) of every object has a new property added for the new locale. Each new property is initially set to the value of the property name in the active locale, preceded by the short form of the locale name in parentheses. For example, if the property value was "query" in the active locale (e.g., English), the French value will initially be set to "(fr-fr)query".

An object in a metadata model contains a set of properties (e.g., Name, description, etc.). Each of these properties may have multiple instances, one for each locale supported by the model. When viewing the metadata, the properties that match the Active Locale are normally presented to the user. However, the property viewer also has a mode that permits viewing of all locales supported by the model at the same time.

Figure 4:
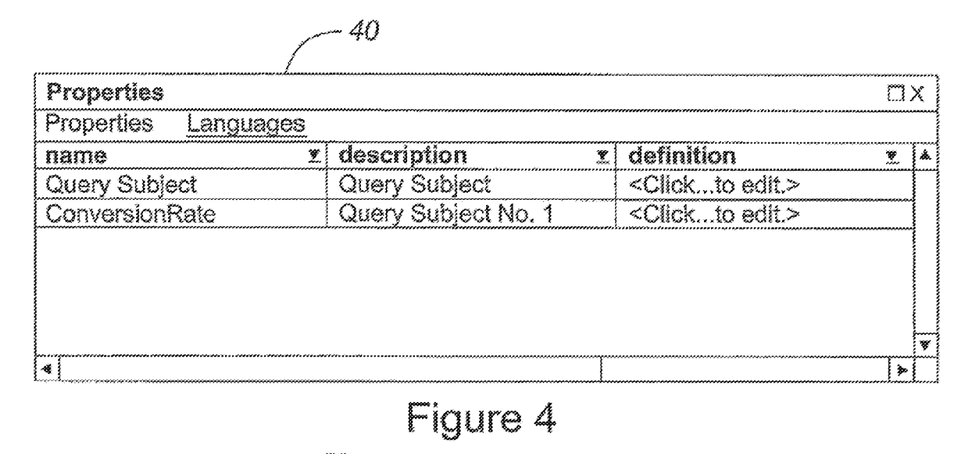
FIG. 4 shows a screen shot of an example of a property view of objects in a metadata model, in accordance with the multilingual metadata system.
Figure 5:
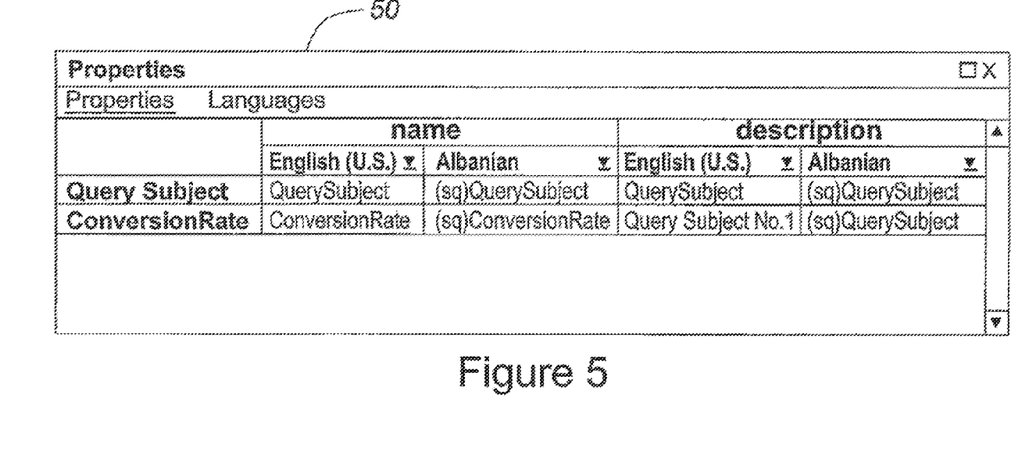
FIG. 5 shows a screen shot of an example of a multi-locale view of objects in a metadata model, in accordance with the multilingual metadata system.

Referring back to FIG. 2, the properties viewer 22 of the display module 12 comprises an active locale unit 25 for displaying in a set language of an active locale the locale sensitive properties of objects in the metadata model, and a multiple locales unit 26 for displaying in a language for each multiple locale the locale sensitive properties of objects in the metadata model. FIG. 4 shows a screen shot of an example of a properties view of objects in a metadata model, displaying two objects in the regular ("Properties") viewing mode 40. Names of the properties are displayed in the active locale (set to English in this example). By clicking on the "Languages" hyperlink, the property view switches into multi-locale mode 50, as shown in FIG. 5, for the same two objects.

The set of text-based properties that are to be exposed to end users of the model are identified as multilingual and are shown in the multi-locale mode. No other properties (e.g., numbers) are identified as multilingual and are thus not displayed in this view. The locale sensitive properties are displayed across the upper row of column headers. Under each property, the set of supported locales is displayed. Observe that the "Albanian" properties were generated by the software (e.g., "(sq) Query Subject"), and are awaiting proper translation. The human translator can recognize non-translated properties by the leading locale value (in this case "sq") in brackets, followed by text in another language. A user, through the multiple locales unit 26, can edit values of locale sensitive objects in the locale repository 11. Editing includes adding, deleting, and changing a value.

Advantageously, the multilingual metadata system 10 allows for the storing of multiple locale values of localizable properties of objects in a metadata model. Locales may be dynamically added to and/or removed from a model, using the Language Dialog 30. A user may view a property sheet viewing values of properties in multiple locales. The multilingual metadata system 10 also provides a view of the model that is filtered based on the active locale. Furthermore, a user may change the active locale independent of the locale of the host environment, again using the Language Dialog 30. This affects only how properties are displayed; it has no affect on the contents of the model.

Figure 6A:
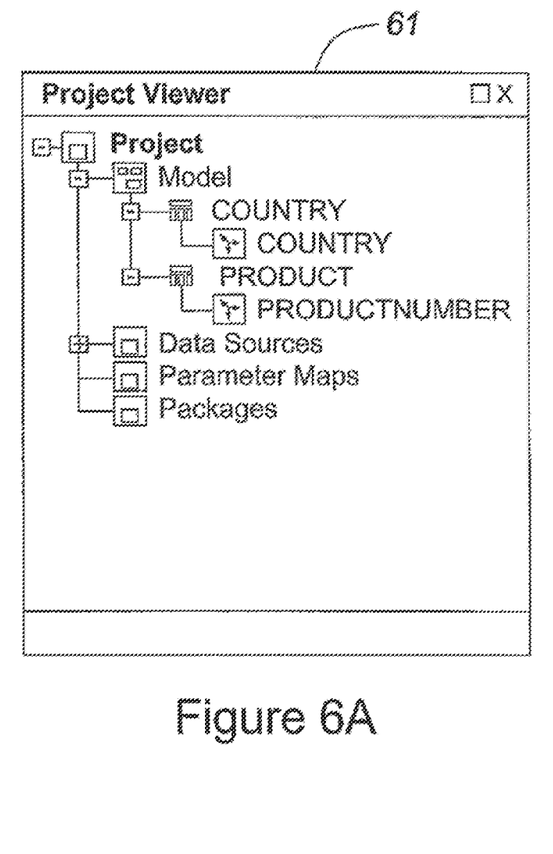
FIGS. 6A and 6B show an example of a tree diagram of a model in a Project Viewer dialog when the active locale is English and French, respectively.
Figure 6B:
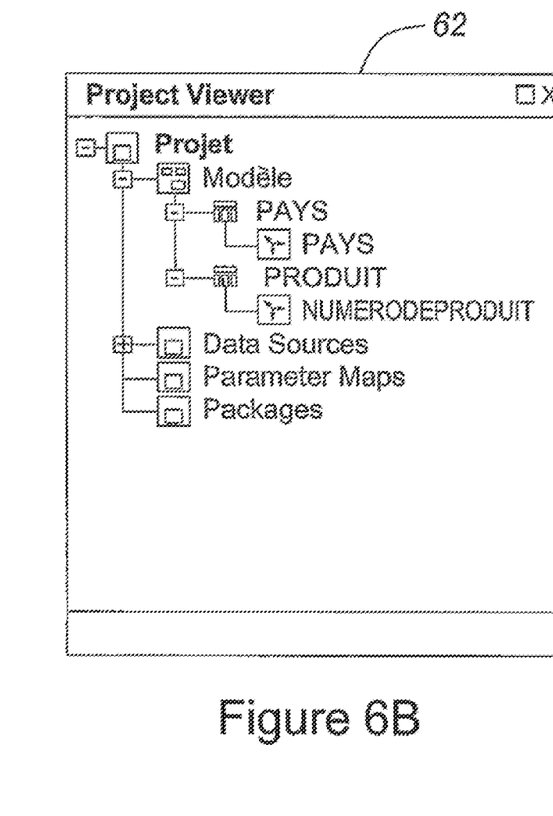

FIGS. 6A and 6B show an example of a tree diagram of a model. FIG. 6A shows a display of a tree diagram of a model in a Project Viewer dialog when the active locale is English 61. By changing the active locale in the Language Dialog 30, the properties in the tree diagram will be changed to reflect the new active locale. FIG. 6B shows a display of the tree diagram of the model in the Project Viewer dialog after the active locale has been changed to French 62. Note, the actual contents of the model have not changed. However, the display of the properties has changed from English 61 to French 62. Advantageously, the Project Viewer dialog allows a modeler to preview the model from the points of view of different users in different languages.

Figure 7:
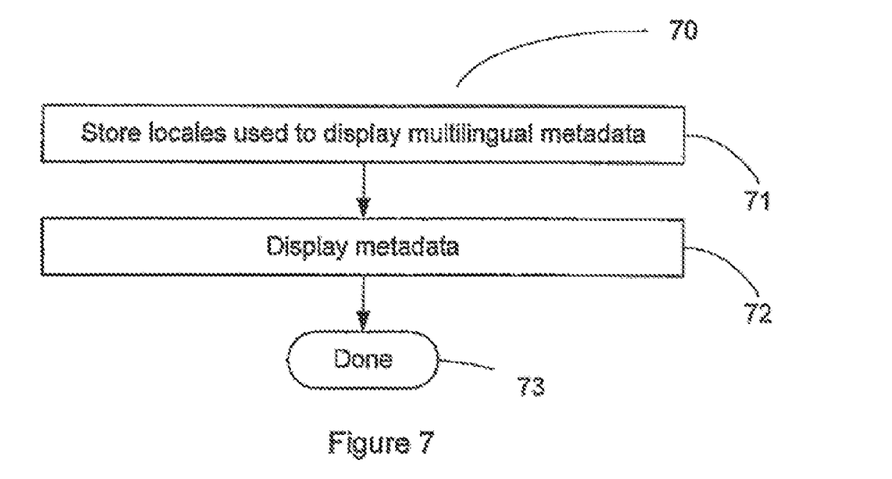
FIG. 7 is a flowchart of an example of a method of displaying multilingual metadata, in accordance with an embodiment of the present invention.

FIG. 7 is a flowchart of an example of a method of displaying multilingual metadata (70). The method begins with storing locales used to display multilingual metadata (71). Next the metadata is displayed (72). The method is done (73). Other steps may be added to this method (70), such as translating locale sensitive properties in the metadata model.

Figure 8:
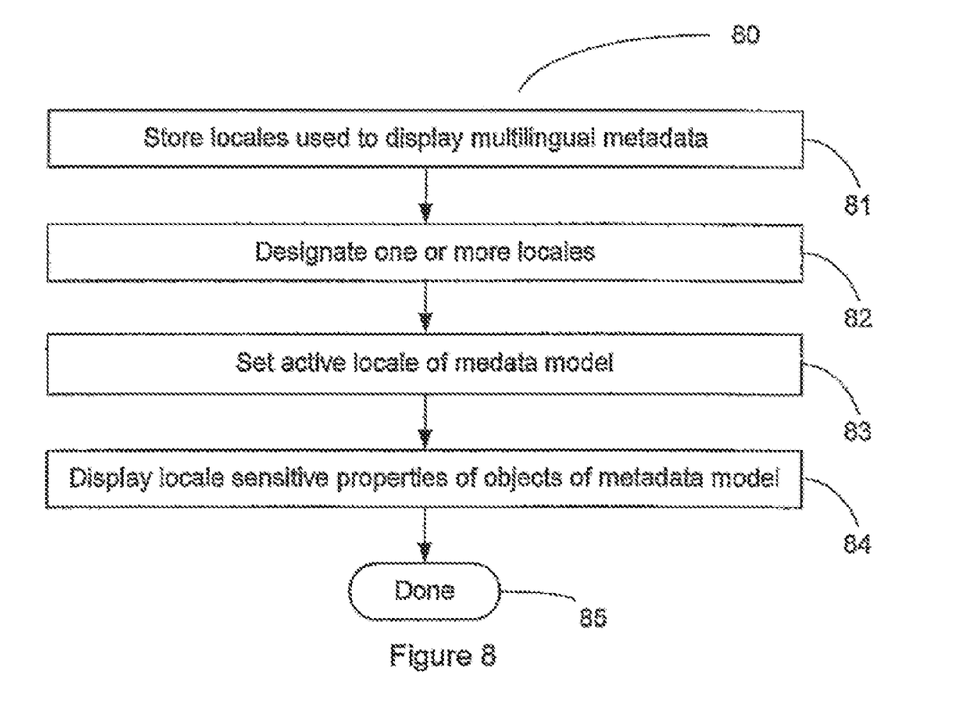
FIG. 8 is a flowchart of another example of a method of displaying multilingual metadata, in accordance with an embodiment of the present invention.

FIG. 8 is a flowchart of another example of a method of displaying multilingual metadata (80). The method begins with storing locale information used to display a multilingual metadata model (81). Next, one or more locale references from the stored locale information are designated (82) and an active locale for the display of the metadata model is set (83). Next, locale sensitive properties of objects in the metadata model are displayed (84). Alternatively, the locale sensitive properties of the objects may be displayed in a language for each locale. The method is done (85).

The property view described above can be used for manual translation of locale-sensitive properties. However, for a large model it can become onerous. A bulk translation scheme is desirable for assisting with large metadata models.

Figure 9:
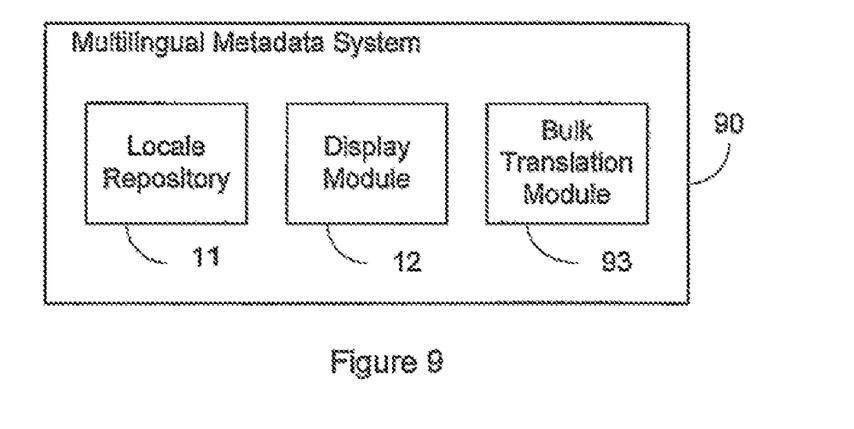
FIG. 9 shows another example of a multilingual metadata system.

FIG. 9 shows another example of a multilingual metadata system 90, in accordance with an embodiment of the present invention. The multilingual metadata system 90 comprises a locale repository 11, a display module 12, and a bulk translation module 93 for translating locale sensitive properties in the metadata model. The locale repository 11 and the display module 12 are described above. The bulk translation module 93 may be software code for performing locale sensitive property translation as described below.

Figure 10:
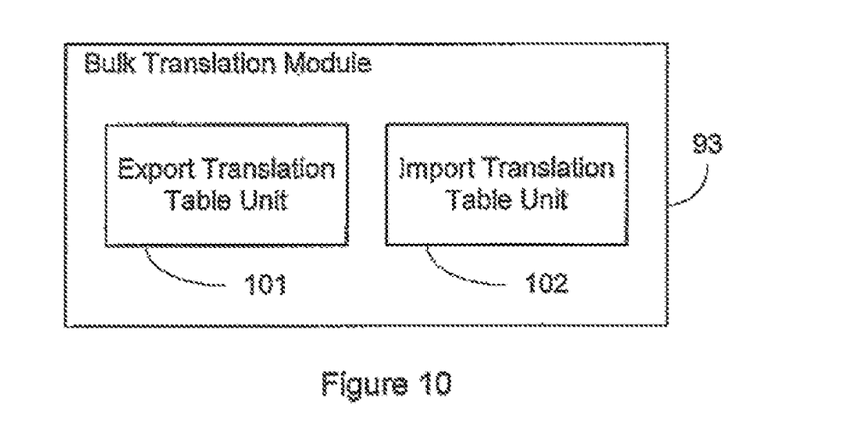
FIG. 10 shows an example of a bulk translation module, in accordance with the multilingual metadata system.

FIG. 10 shows an example of a bulk translation module 93, in accordance with the multilingual metadata system 90. The bulk translation module 93 comprises an export translation unit 101 for creating a translation table, and an import translation unit 102 for updating the locale sensitive properties of objects in the metadata model.

Figure 11:
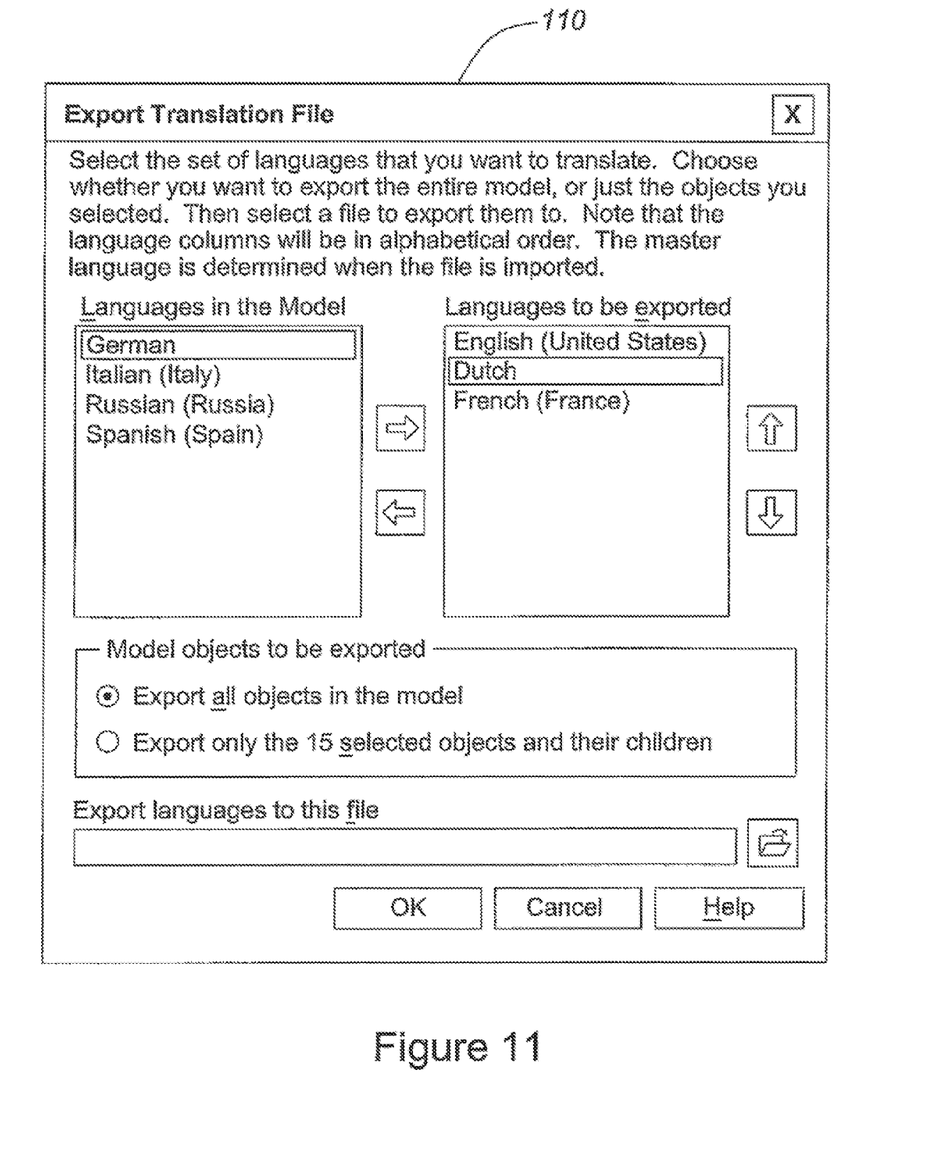
FIG. 11 shows a screenshot of an example of an export translation unit, in accordance with the multilingual metadata system.

FIG. 11 shows a screenshot of an example of an export translation unit 101, in accordance with the multilingual metadata system 90. The export translation unit 101 comprises an Export Translation File dialog 110. The Export Translation File dialog 110 allows a user to select the languages to be exported. All objects in the model can be exported, or only a selected subset. The Export Translation File dialog 110 creates a file containing a translation table. The rows of this table represent every multilingual property in the model Active Locale. The columns represent each locale in the model selected by the user for export, and each cell is populated with the value of the given property in the given locale. Preferably, this table is saved into a delimited file (such as an external file that can be edited in a spreadsheet). A separate user, such as a translations group, can then edit this file.

A user may view the table in a spreadsheet, where, typically, the first column is the original language, and the other columns are what the user may translate. The user may manually translate each row of values for the multiple locales. After the translation in the spreadsheet has been done, the results may be re-imported back into the model. The user picks a "master language" and the languages that will be translated. The instances of terms in the master language column have the translation applied to it.

Figure 12:
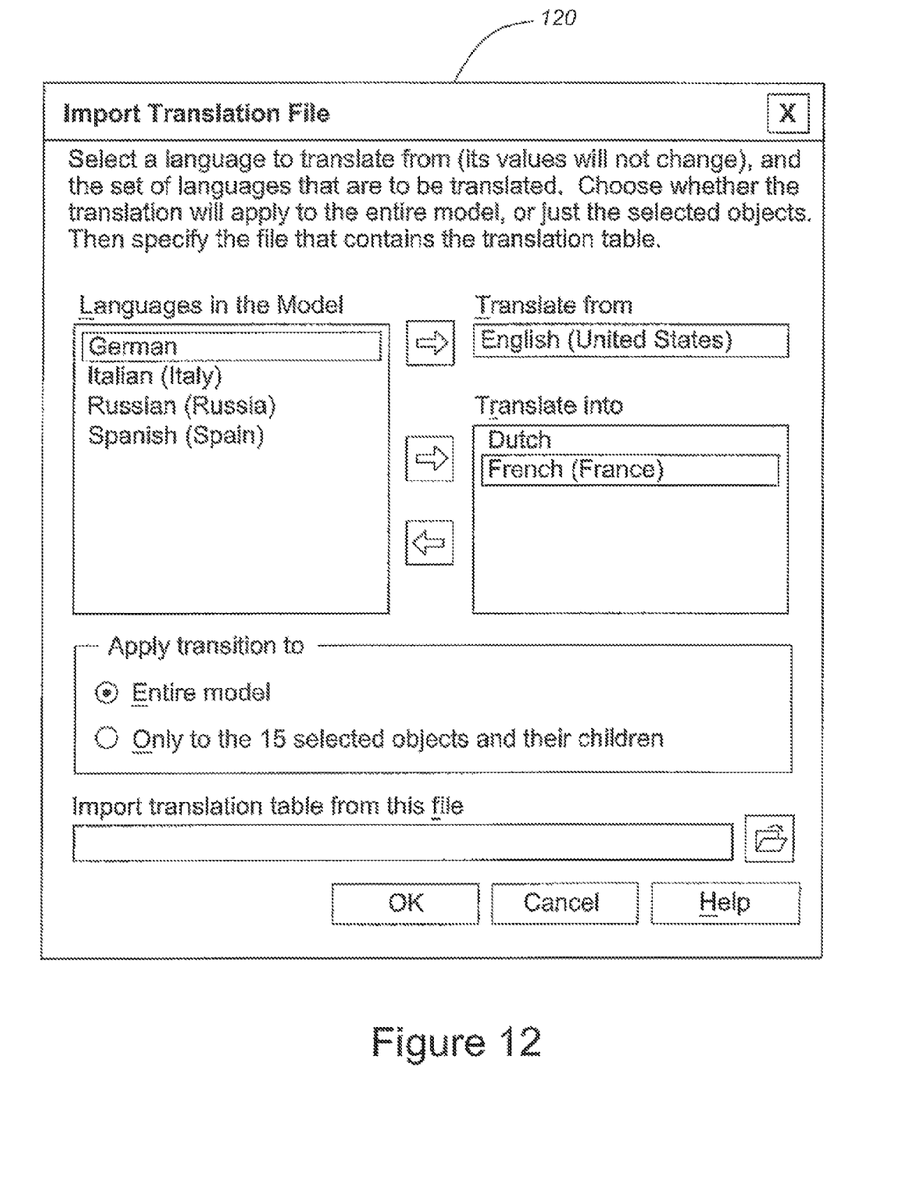
FIG. 12 shows a screenshot of an example of an import translation unit, in accordance with the multilingual metadata system.

FIG. 12 shows a screenshot of an example of an import translation unit 102, in accordance with the multilingual metadata system 90. The export translation unit 102 comprises an Import Translation File dialog 120. The Import Translation File dialog 120 allows a user to select a master language from which the translation table may be applied to the metadata model. FIG. 12 shows English as the master language (Translate From box). If one of the terms (row values) is "Product", then every object that has the value "Product" in English will have its Dutch and French locale values translated from the corresponding columns in the spreadsheet.

Figure 13A:
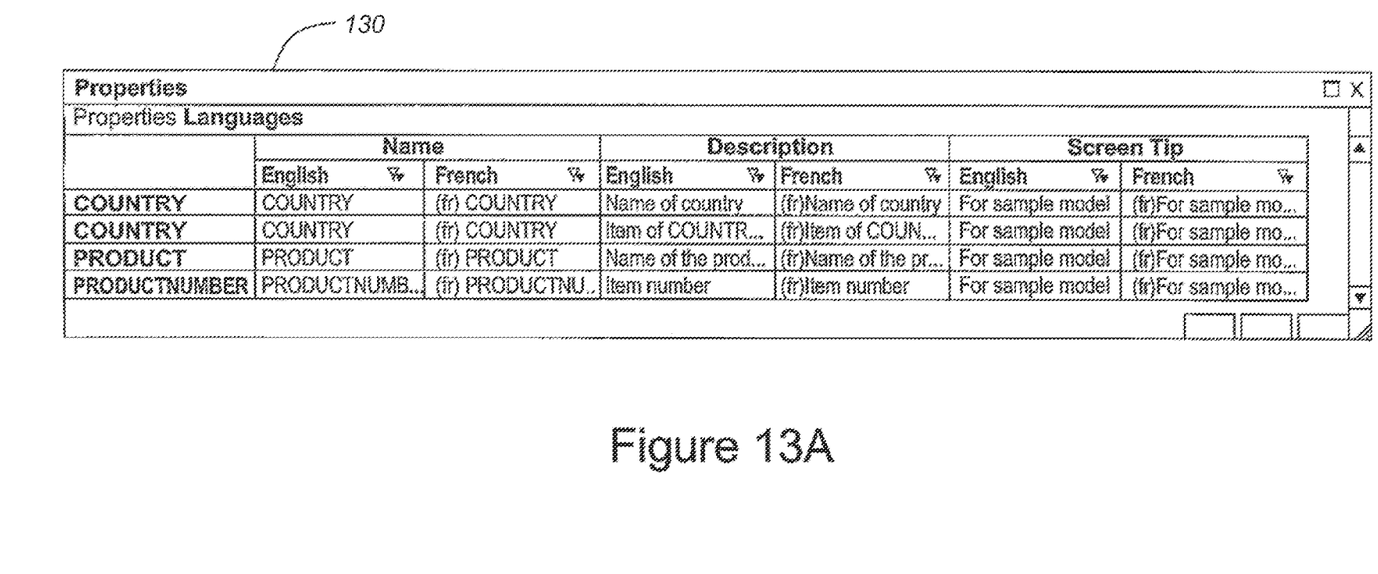
FIGS. 13A to 13D are screen shots that illustrate an example of a translation cycle, in accordance with the multilingual metadata system.
Figure 13B:
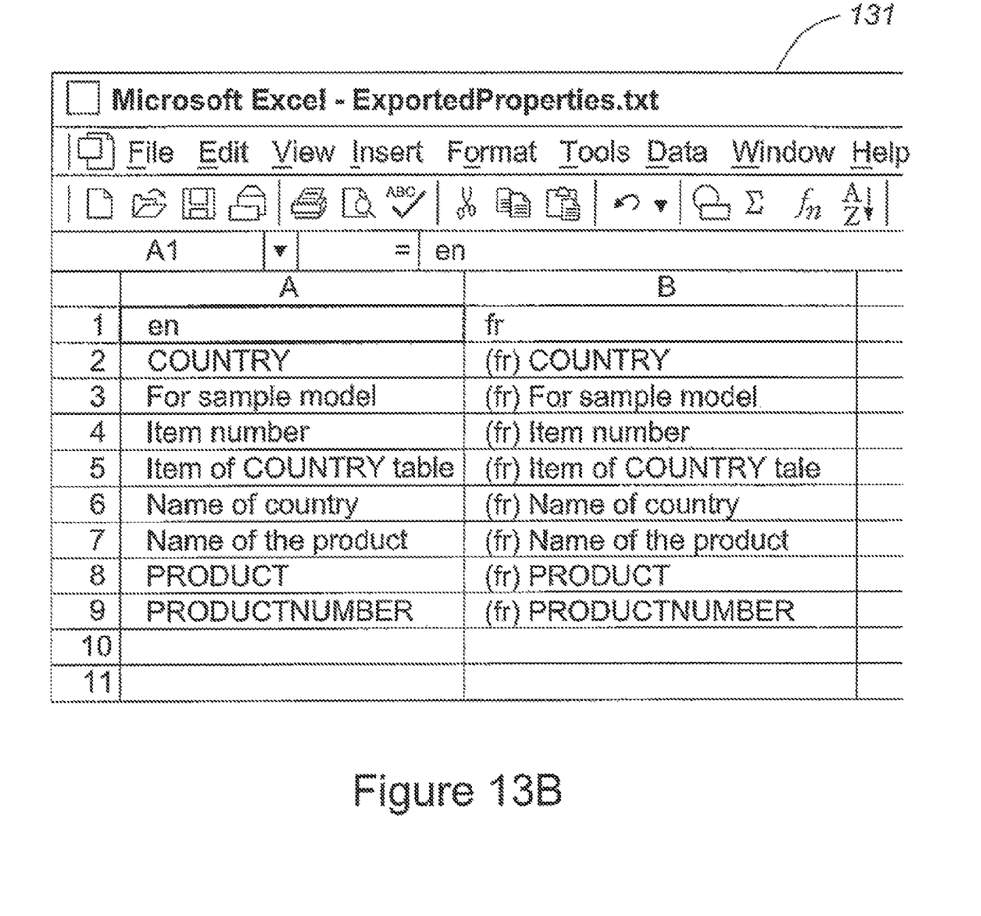
Figure 13C:
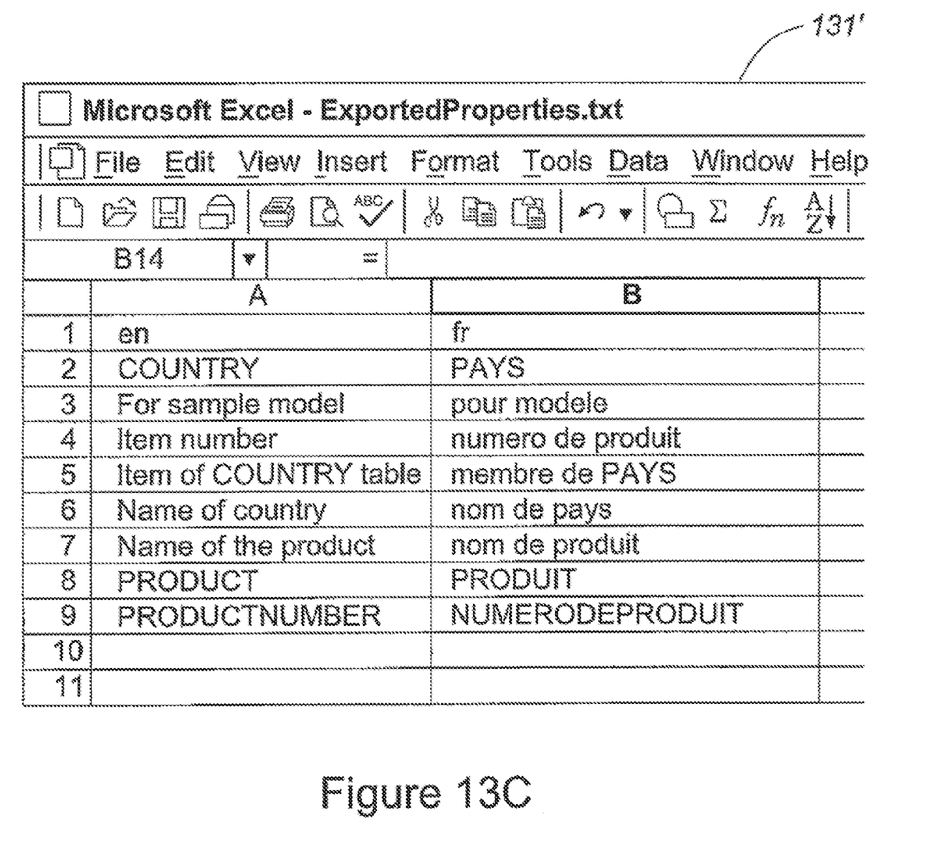
Figure 13D:
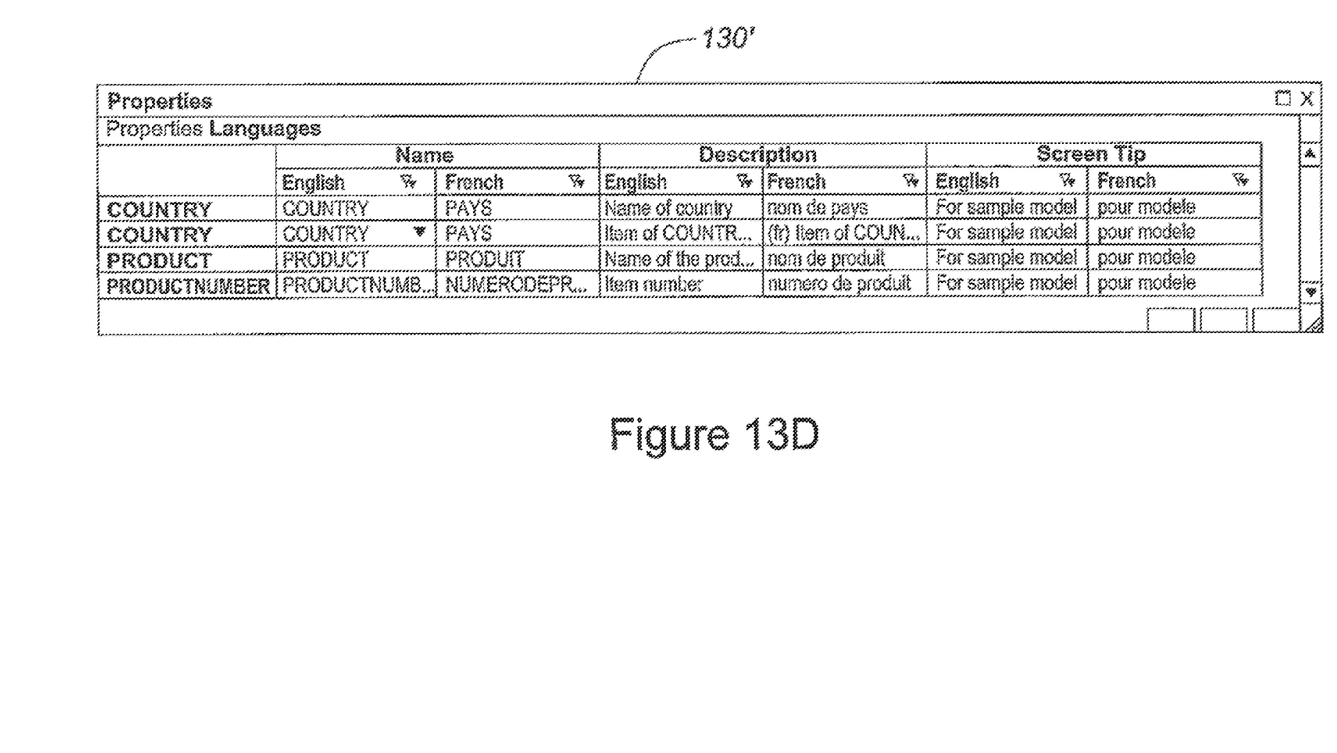

FIGS. 13A to 13D are screen shots that illustrate an example of the translation cycle, in accordance with the multilingual metadata system 11. In FIG. 13A, the model supports two languages—English and French. The model is created in English, four objects are created with property values, and then French is added to the model. The French column shows the text generated by the program, which is the English name preceded by "(fr)". In FIG. 13B, the Export Translation File dialog 110 is used to export these four objects to a file 131, which are then loaded into a spreadsheet. Note that while "COUNTRY" appears twice in the property sheet 130, it appears only once in the file 131. In FIG. 13C, The French terms are then translated by hand, and exported back to the file 131'. In FIG. 13D, the Import Translation Dialog 120 is run to import the translated file. The Property sheet 130' shows the results of the translation. Note that in the two places "COUNTRY" appeared, it has been translated into "PAYS". The property value "For sample model" was translated into "pour modele" four times.

Note that providing the ability to export and import translations on a subset of the objects in the model enables the modeler to define "context-sensitive translations" (as different parts of the model may represent different contexts, and thus the same translation for a given term may not be applicable across those parts). For example, if in one part of the model there exists an object called "product" which represents an actual product being sold, wherein another object exists with the same name but represents a mathematical computation, the translation for this term may differ. If so, then the modeler first imports a translation for the first "product" to address the first context, then updates their translation file and re-imports it for the second "product" to address the second context.

Figure 14:
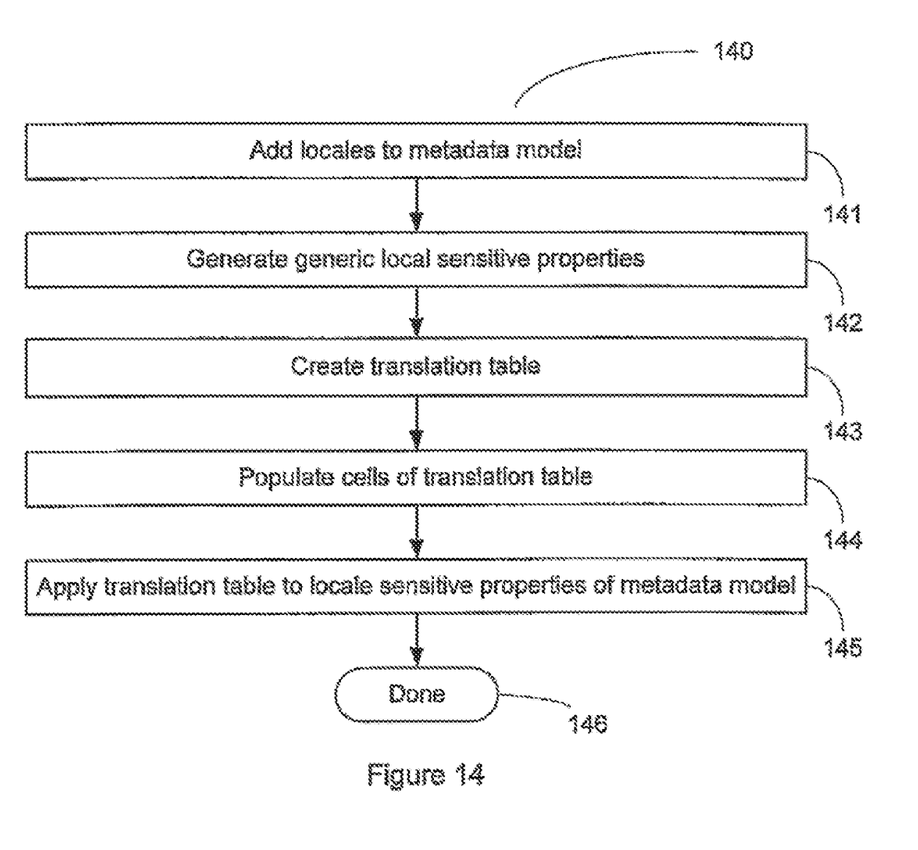
FIG. 14 is a flowchart of an example of a method of translating locale sensitive properties of objects in a metadata model.

FIG. 14 shows a flowchart of an example of a method of translating locale sensitive properties of objects in a metadata model (140). A user may create or import a metadata model in the multilingual metadata model system 90 and set the locale sensitive property names in the Active Locale. Other locales may be added to the model (141). For each new locale that is added, new generic locale sensitive properties are generated and initialised (142). Preferably, the initialised values follow the form {(locale)][value of Active Language] (e.g., "(fr) Query Subject", where (fr) is the French locale and Query Subject is the value in the Active Language). A file containing a translation table is created (143). The rows and columns of this table are as described above. Cells of the translation table may be translated (144). The translation table is then applied to the locale sensitive properties of a set of objects (and any descendant objects) (145). The method is done (146).

The multilingual metadata system 10, 90 and the methods described above according to the present invention may be implemented by any hardware, software or a combination of hardware and software having the above described functions. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A computer system for representing multiple locales in metadata models, the computer system comprising:
  a locale repository within the computer system for storing locale information used to display multilingual metadata, the locale repository comprising:
  locale references for representing locales; and
  multiple values of locale sensitive objects in a metadata model for representing locale values of the objects; and a display module within the computer system for displaying the metadata model, wherein a display module is configured to generate a user interface dialog to be displayed to a user for modifying settings of the display module, wherein the user interface dialog comprises a locales selector for designating one or more locales from the locale repository to be supported by the metadata model and an active locale selector for setting an active locale within the one or more locales, and wherein the user interface dialog comprises a properties viewer interface for displaying locale sensitive properties of the objects in the metadata model in accordance with the active locale, and wherein responsive to the user adding a new locale to the one or more locales using the user interface dialog, the computer system adds a new property to every locale sensitive property of every object in the metadata model.

2. The computer system of claim 1, wherein the properties viewer interface comprises:

a multiple locales unit for displaying in a language for each multiple locale the properties of the objects in the metadata model.

3. The computer system of claim 2, wherein the multiple locales unit has a dynamic translation unit for allowing a user to manually edit a locale value in the locale repository.

4. The computer system of claim 1, further comprising a bulk translation module for translating a plurality of locale sensitive values in the local repository.

5. A method, in a computer system, for representing multiple locales in metadata models, the method comprising:

storing, by the computer system, locale information used to display a multilingual metadata model, wherein the locale information comprises locale references for representing locales and multiple values of locale sensitive objects in a metadata model for representing locale values of the objects;

generating, by the computer system, a user interface dialog to be displayed to a user for modifying settings of the display module, wherein the user interface dialog comprises a locales selector for designating one or more locales from the locale repository to be supported by the metadata model and an active locale selector for setting an active locale within the one or more locales, and wherein the user interface dialog comprises a properties viewer interface for displaying locale sensitive properties of the objects in the metadata model in accordance with the active locale; and responsive to the user adding a new locale to the one or more locales using the user interface dialog, adding, by the computer system, a new property to every locale sensitive property of every object in the metadata model.

6. The method of claim 5, further comprising displaying in a language for each locale the locale sensitive properties of the objects in the metadata model.

7. The method of claim 5, further comprising translating a locale sensitive property in the metadata model.

8. A computer program product for use in the execution in a computer of a system for displaying and modifying a graph representation of a data model, the computer program product comprising a computer storage medium having a computer readable program stored thereon, wherein the computer readable program, when executed by the computer, causes the computer to:

store in a locale repository information used to display multilingual metadata, the locale repository comprising:
locale references for representing locales; and
multiple values of locale sensitive objects in a metadata model for representing locale values of the objects; and generate a user interface dialog to be displayed to a user for modifying settings of the display module, wherein the user interface dialog comprises a locales selector for designating one or more locales from the locale repository to be supported by the metadata model and an active locale selector for setting an active locale within the one or more locales, and wherein the user interface dialog comprises a properties viewer interface for displaying locale sensitive properties of the objects in the metadata model in accordance with the active locale; and responsive to the user adding a new locale to the one or more locales using the user interface dialog, add a new property to every locale sensitive property of every object in the metadata model.

9. The computer program product of claim 8, wherein the properties viewer interface comprises:

a multiple locales unit for displaying in a language for each multiple locale the properties of the objects in the metadata model.

10. The computer program product of claim 8, wherein the multiple locales unit has a dynamic translation unit for allowing a user to manually edit a locale value in the locale repository.

11. The computer program product of claim 8, wherein the computer readable program further causes the computer to translate a plurality of locale sensitive values in the local repository.

12. The computer program product of claim 11, wherein the computer readable program further causes the computer to:

create a translation table, the translation table comprising:
rows representing multilingual properties; and
columns representing locales of the metadata model; and update the locale sensitive properties of the objects in the metadata model based upon the translation table.

* * * * *

UNITED STATES PATENT AND TRADEMARK OFFICE
CERTIFICATE OF CORRECTION

| | | |
|---|---|---|
| PATENT NO. | : 8,010,530 B2 | Page 1 of 1 |
| APPLICATION NO. | : 12/183396 | |
| DATED | : August 30, 2011 | |
| INVENTOR(S) | : Charles Mike Potter | |

It is certified that error appears in the above-identified patent and that said Letters Patent is hereby corrected as shown below:

Col. 1, before line 4: please insert:

--This application is a continuation of U.S. Patent Application 10/851,944, filed May 21, 2004, now U.S. Patent No. 7,409,410, which claims foreign priority to Canadian Patent Application 2,429,558, filed May 22, 2003.--

Signed and Sealed this
Twenty-ninth Day of November, 2011

David J. Kappos
*Director of the United States Patent and Trademark Office*